United States Patent [19]

Siahatgar

[11] Patent Number: 4,907,388
[45] Date of Patent: Mar. 13, 1990

[54] MODULAR PANEL FRAME ASSEMBLY SYSTEM

[76] Inventor: Mohammed T. Siahatgar, P.O. Box 3904, Laguna Hills, Calif. 92653-3904

[21] Appl. No.: 231,218

[22] Filed: Aug. 11, 1988

[51] Int. Cl.⁴ .............................................. F16B 7/04
[52] U.S. Cl. ...................................... 52/584; 403/252
[58] Field of Search ................. 52/584, 282, 285, 286; 403/187, 252, 254, 255, 264

[56] References Cited

U.S. PATENT DOCUMENTS

| | | | |
|---|---|---|---|
| 4,101,231 | 7/1978 | Streib ................................... | 403/252 |
| 4,345,849 | 8/1982 | Stenemann ........................... | 403/252 |
| 4,360,286 | 11/1982 | Beer .................................. | 403/255 X |
| 4,458,455 | 7/1984 | Tollstoff de Voss .............. | 52/584 X |

FOREIGN PATENT DOCUMENTS

| | | | |
|---|---|---|---|
| 2732910 | 2/1979 | Fed. Rep. of Germany ...... | 403/252 |
| 442870 | 1/1968 | Switzerland ......................... | 403/252 |

OTHER PUBLICATIONS

Abstracts of Agam Procede Sodem, pp. 6 and 10.
Abstracts of Foga Systems.
Abstracts of Consta Systems.
Abstracts of Syma—Systems, dated 6/24/85.
Abstracts of Newline Octanorm.
Applicant's sketch to prior art known before the filing date of the present application.
Abstract of the Components.

*Primary Examiner*—David A. Scherbel
*Assistant Examiner*—Jerrold D. Johnson
*Attorney, Agent, or Firm*—Poms, Smith, Lande & Rose

[57] ABSTRACT

A modular panel frame assembly system which uses an expandable clamp which has opposing jaws that are always separated from one another by a substantial space. The system includes frame members which are engaged by the expandable clamp and have at least one pair of opposing end flanges separated by a center rail of T-Shaped configuration.

12 Claims, 7 Drawing Sheets

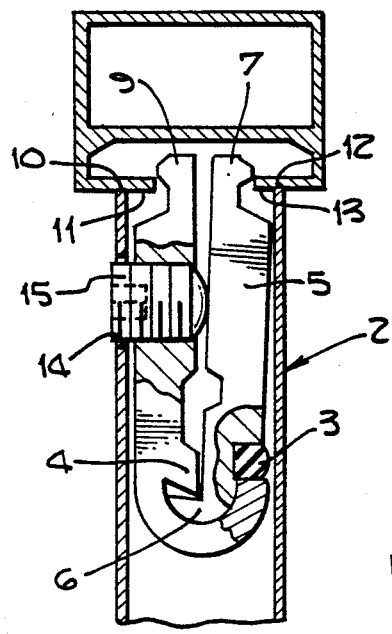
Fig. 1. PRIOR ART
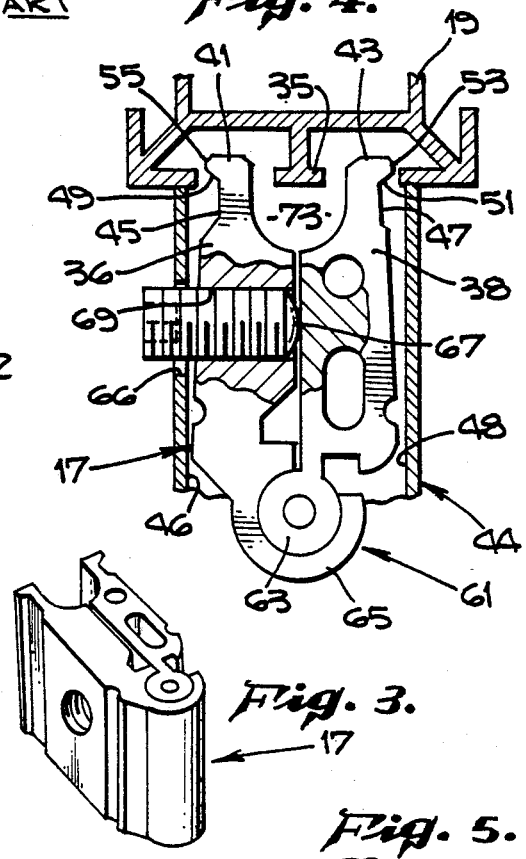
Fig. 4.
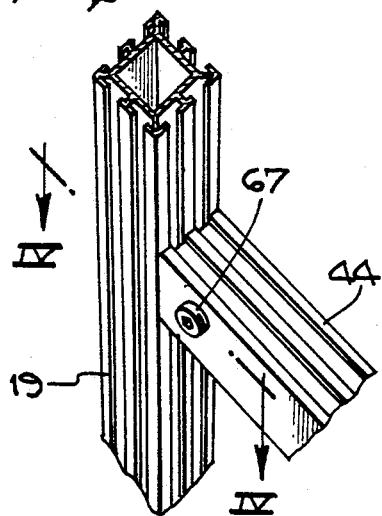
Fig. 2.
Fig. 3.
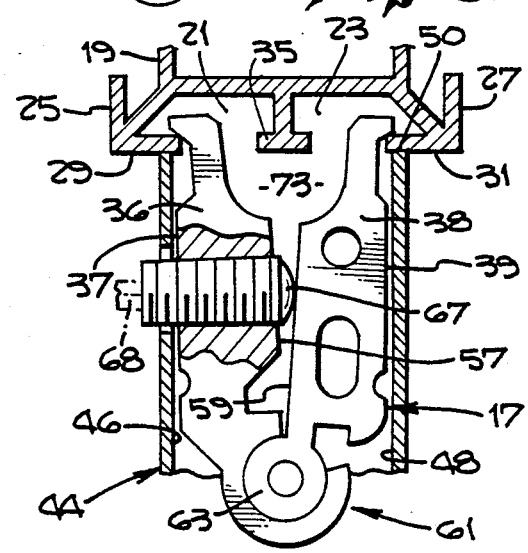
Fig. 5.

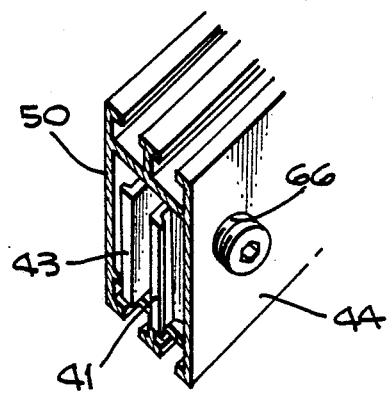
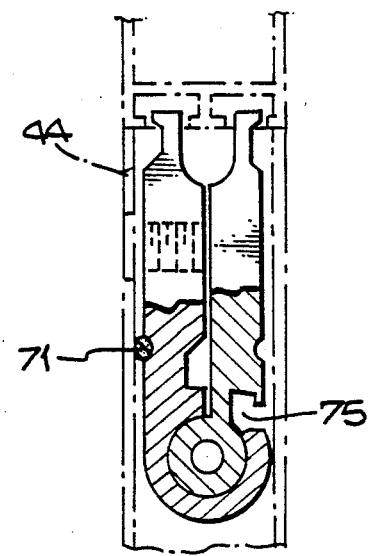
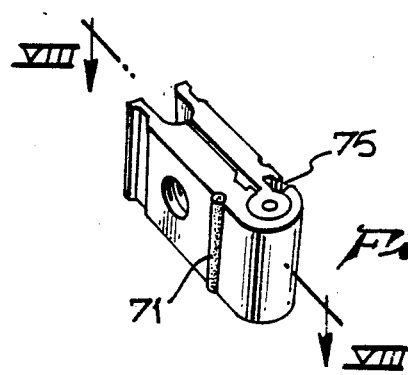
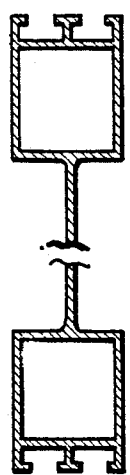
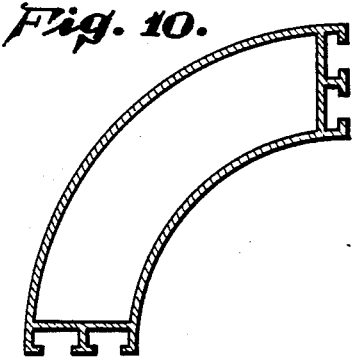

Fig. 11.a
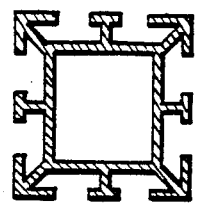
Fig. 11.b
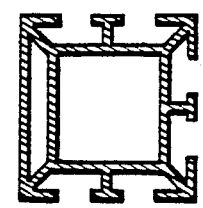
Fig. 11.c
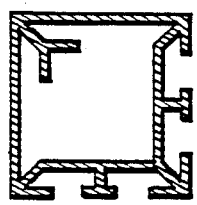
Fig. 11.d
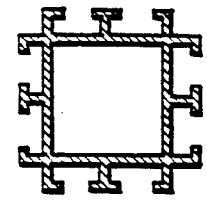
Fig. 11.e
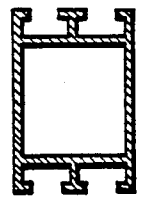
Fig. 11.f
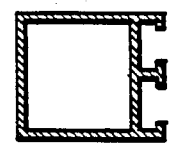

Fig. 11.g
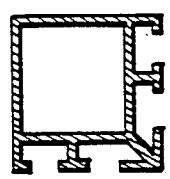
Fig. 11.h
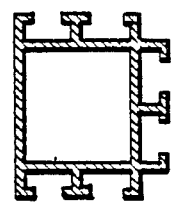
Fig. 11.i
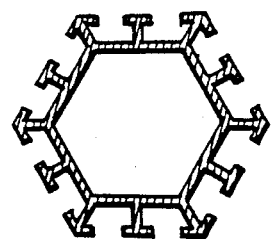
Fig. 11.j
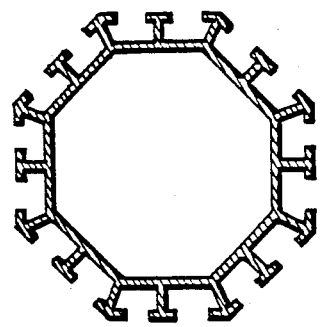
Fig. 11.k
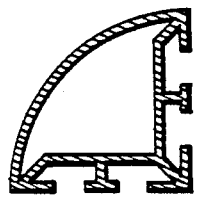
Fig. 11.l
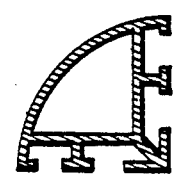

Fig. 12.ᵃ
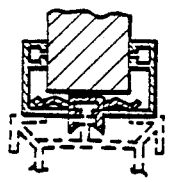
Fig. 12.ᵈ
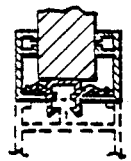
Fig. 12.ᵉ
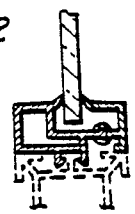
Fig. 12.ᵇ
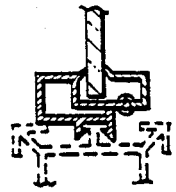
Fig. 12.ᶠ
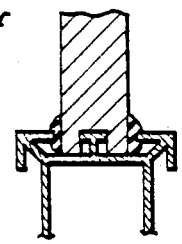
Fig. 12.ᶜ
Fig. 12.ᵍ
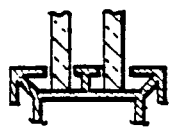

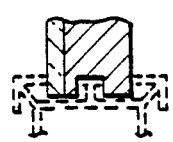
Fig. 12.h
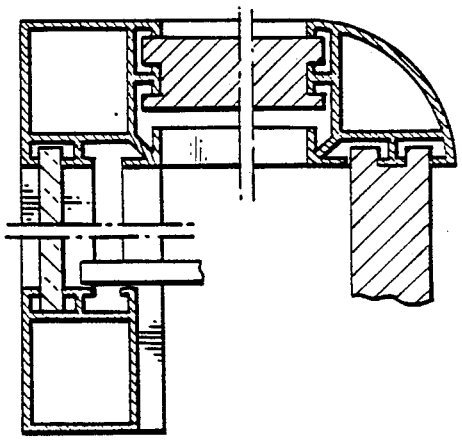
Fig. 12.k
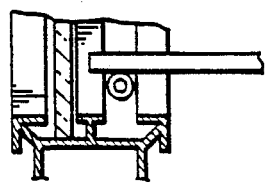
Fig. 12.i
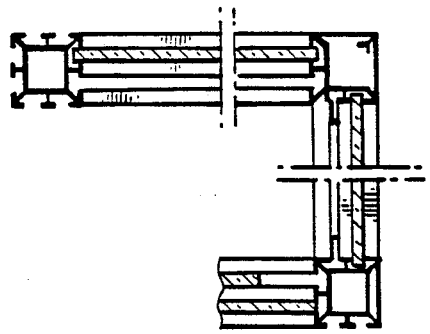
Fig. 12.j
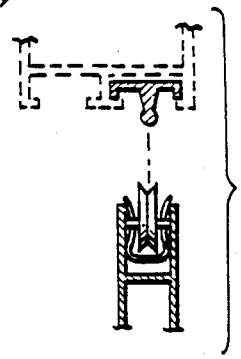
Fig. 12.l

MODULAR PANEL FRAME ASSEMBLY SYSTEM

BACKGROUND OF THE INVENTION

1. Field of the Invention

This invention relates to panel frame assembly systems and, more specifically, to panel frame assembly systems which are modular and which can easily and solidly be assembled into a broad variety of configurations.

2. Description of Related Art

Modular panel frame assembly systems are in great demand today. Typical applications include office partitions, display racks and window supports.

Such modular systems usually include elongated frame members which must be joined to one another in a manner which is sturdy, easy to assemble, and sufficiently flexible to meet a broad variety of configurations and applications.

One significant problem with the assembly systems known to applicant is a lack of structural strength in the joint between frame members. The assembled system is thus rendered susceptible to deformation and unexpected detachment.

Another problem with such systems are limitations which the joining mechanism often imposes upon the types of structural embodiments which can be created.

A still further problem with such systems are difficulties and delays in the assembly process which are caused by several structural attributes of existing systems.

There therefore has been a continuing need for a modular panel frame assembly system which has great structural strength, is not easily subject to deformation or unexpected detachment, and can be easily and quickly assembled into a broad variety of embodiments.

SUMMARY OF THE INVENTION

One object of the present invention is to obviate these and other problems in the prior art.

Another object of the present invention is to provide a modular panel frame assembly system which, following assembly, displays great structural strength.

A further object of the present invention is to provide a modular panel frame assembly system which, following assembly, is not readily subject to deformation or unexpected detachment.

A still further object of the present invention is to provide a modular panel frame assembly system which can satisfy a broad variety of applications and can be assembled into numerous useful embodiments.

A still further object to the present invention is to provide a modular panel frame assembly system which can easily and quickly be assembled.

These and other objects to the present invention are achieved through the use of an expandable clamp which connects one frame member to another by engaging opposing interned end flanges with opposing jaws that are separated from one anther by a space in the shape of a half-cylinder.

The frame member engaged by the opposing jaws in one preferred embodiment contains at least one pair of longitudinal channels on one side thereof, each having an interned end flange which together define the outer edge of each channel opening and a center rail of T-shaped configuration which defines the inner edge of each channel opening.

Each clamp jaw further includes an outer and inner surface which are slightly inclined with respect to one another.

The jaws are joined at one end by a cylindrical joint, one jaw containing the inner cylinder of the joint, the other containing the outer cylinder.

In order to allow for easy insertion, the jaws are urgingly engaged against one another through the use of a stretchable material, such as a rubber band.

In an alternative exemplary embodiment, the opposing jaws of the clamp are provided in opposing, facing relationship and the clamp is so provided that the jaws come together about the center rail, of T-shaped configuration, positioned between the pair of longitudinal channels as the clamp body has expanded in the adjacent frame member.

These and other features of the present invention and its attendant advantages and benefits will now become apparent as the invention becomes better understood by reference to the following detailed description when considered in conjunction with the accompanying drawings.

BRIEF DESCRIPTION OF THE DRAWINGS

FIG. 1 is a sectional view of a prior art panel frame assembly system.

FIG. 2 is a perspective view of one embodiment of two frame members made and joined in accordance with the present invention.

FIG. 3 is a perspective view of the clamp which is joining the two frame members shown in FIG. 2.

FIG. 4 is a sectional view of FIG. 2 taken along the line III—III.

FIG. 5 is a sectional view of another embodiment of a clamp and member made in accordance with the present invention.

FIG. 6 is a perspective view of the clamp and one of the frame members shown in FIGS. 2 and 4, respectively, showing the clamp resting inside of the frame member.

FIG. 7 is a perspective view of another embodiment of a clamp made in accordance with the present invention.

FIG. 8 is a sectional view of the clamp shown in FIG. 7 taken along the line VIII—VIII, shown mated with one embodiment of a frame member made in accordance with the present invention.

FIGS. 9, 10 and 11 (a)–(l) are sectional views of various embodiments of frame members made in accordance with the present invention.

FIGS. 12 (a)–(m) are sectional views showing variously embodiments of frame members, made in accordance with the present invention, being joined with a variety of other types of structural elements.

DETAILED DESCRIPTION OF THE PREFERRED EMBODIMENTS

Figure 13:
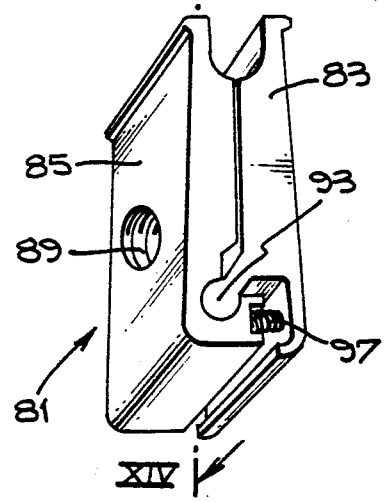
FIG. 13 is a perspective view of an alternate embodiment of a clamp which can be used to join the two frame members shown in FIG. 2.

FIG. 1 is a sectional view of a prior art panel frame assembly system.

As can be seen in FIG. 1, the prior art system includes a first frame member 1 being joined to a second frame member 2 with an expandable clamp 5.

The expandable clamp 5 includes a set screw 15 which causes the expandable clamp 5 to expand. It also includes a compressible material 3 which urges the expandable clamp 5 into a closed position when the set screw 15 is not tightened.

To use this prior art panel frame assembly system, the expandable clamp 5 is inserted into the frame member 2. The set screw 15 is then loosely screwed in the expandable clamp 5 through an opening 14 in the frame member 2.

Thereafter, jaws 7 and 9 of expandable clamp 5 are inserted between flanges 11 and 13 of the frame member 1. Once placed in this position, the set screw 15 is torqued, forcing the jaws 7 and 9 to spread. As this torquing continues, the jaws 7 and 9 will slidably engage flanges and 13, forcing the frame member 2 towards the frame member 1. Ultimately, end surfaces 10 and 12 will come firmly in contact with the side portions of flanges 11 and 13. The frame members 1 and 2 will then be locked together.

This prior art system, however, suffers from several problems.

In use, stresses on the system sometimes cause deformation of end surfaces 10 and/or 12, the flanges 11 and/or 13, and/or the jaws 7 and/or 9. As a result, the joint often loosens and, occasionally, detaches.

Several difficulties are also encountered with assembling this prior art system. The sharp corners on connecting joints 4 and 6 make rapid interlocking of the jaws 7 and 9 difficult. Similarly, the compressible material 3 is often difficult to quickly insert. Because of the close proximity of the set screw 15 to the end surface 10, moreover, a large degree of rotation of the set screw 15 is often necessary in order to firmly lock the frame member 1 to the frame member 2. The relatively small amount of material between the end surface 10 and the set screw 15 also weakens the structural integrity of the joint.

FIG. 2 is a perspective view of one embodiment of two frame members, 19 and 44, made and joined in accordance with the present invention.

FIG. 3 is a perspective view of one embodiment of an expandable clamp 17 made in accordance with the present invention, which is being used to join the frame members 19 and 44 shown in FIG. 2. The details of this embodiment are best understood by reference to FIG. 4, which is a sectional view of FIG. 2, taken along the line III—III.

As can be seen in FIG. 4, the frame member 19 has channels 21 and 23 which are formed by side rails 25 and 27 and center rail 35.

The side rails 25 and 27 include end flanges 29 and 31 which opposingly face each other. The center rail 35 is of a T-shaped configuration.

The expandable clamp 17 includes jaws 36 and 38. The jaws 36 and 38, in turn, include jaw heads 41 and 43 and jaw necks 45 and 47, respectively.

The jaw heads 41 and 43 include wedged surfaces 49 and 51 and outwardly directed faces 53 and 55, respectively.

As also shown in FIG. 4, the expandable clamp 17 has been positioned between opposing planar inner surfaces 46 and 48 of the frame member 44. (A better understanding of the relationship between the expandable clamp 17 and the frame member 44 can be seen from the perspective view of the same shown in FIG. 6.)

After the expandable clamp 17 is positioned with respect to the frame members 19 and 44, as shown in FIG. 4, the jaws 36 and 38 are caused to expand outwardly with respect to one another.

One mechanism for causing this expansion is best shown in FIG. 5. As can be seen in FIG. 5, the expandable clamp 17 further includes a set screw 67 which is threadingly engaged with an opening 69 in the jaw 36. When the set screw 67 is torqued by an Allen wrench 68 (which does not form a part of the subject invention but is only used in conjunction therewith), the set screw 67 protrudes from the inner portion of the opening 69, pushing apart the jaws 36 and 38.

This outward movement, in turn, causes the wedged surfaces 49 and 51 (referring to FIG. 4) to engage the flanges 29 and 31, respectively. In turn, this causes the expandable clamp 17 to move forward. Because the set screw 67 protrudes through the opening 66 of the frame member 44 (see FIG. 5), the frame member 44 is similarly urged forward.

This forward movement of the expandable clamp 17 and the frame member 44 continues until the frame member 44 comes in firm contact with the frame member 19.

As can be seen by a comparison of FIGS. 1 and 4, the distance between the jaw heads 41 and 43 is much wider than in the prior art. This gives greater strength to the connection between the frame members 19 and 44.

A hollow space 73 lies between the jaw heads 41 and 43 and is approximately in the shape of a half-cylinder. This achieves greater strength in the jaw necks 45 and 47 with a minimum amount of material. It also allows for easy insertion of the expandable clamp 17 into the frame members. Whether expanded or not, the space 73 allows the expandable clamp 17 to clear the center rail 35 of the frame member 19.

Another important feature of the expandable clamp 17 which adds to the overall binding strength is the fact that the outwardly directed faces 53 and 55 are in approximately the same plane as exterior surfaces 37 and 39, respectively.

A still further feature of the present invention is the fact that inner surface 57 lies in a plane which is slightly askewed from the plane of exterior surface 39. Similarly, inner surface 59 lies in a plane which is slightly askewed from the plane of exterior surface 37.

The degree of offset is chosen such that the exterior surfaces 37 and 39 will be approximately parallel to the opposing planar interior surfaces 46 and 48 when the expandable clamp 17 is expanded into a locked configuration. Again, this maximized the strength and stability of the system.

Further adding to the strength and stability of the system is the precise relationship between the positions of the end flanges 29 and 31, the wedged surfaces 49 and 51, the exterior surfaces 37 and 39, and the opposing planar interior surfaces 46 and 48. More specifically, all of these surfaces are positioned such that there is a very slight gap between the exterior surfaces 37 and 39 and the opposing planar interior surfaces 46 and 48, respectively, when the wedged surfaces 49 and 51 are firmly engaged with the end flanges 29 and 31, respectively.

As can be seen from an examination of FIGS. 5 and 6, the set screw 67 must have a length sufficient so that it still protrudes from the opening 66 in the frame member 44 when the expandable clamp 17 is fully expanded. Moreover, the distance between the opening 66 and the tipped most portion 50 of the frame member 44 should be substantial so as to minimize the possibility that the intervening material in the frame member 44 will deform under stress. This distance is greater than the distance of the prior art clamp shown in FIG. 1. (FIG. 1 is actually enlarged so that this difference appears to be otherwise.)

A still further feature of the present invention, as best seen in FIG. 4, is a cylindrical joint 61. The joint 61 includes an inner cylinder 63 which is affixed to the jaw 38 and an outer cylinder 65 which is affixed to the jaw 36. Unlike the sharp points found in the joints 4 and 6 of the prior art (see FIG 1), the cylindrical joint 61 presents smooth and continuous surfaces. This eases the precision needed in mating the jaws 36 and 38 together and reduces friction from hang ups which sometimes occurs with the prior art structure when in use.

FIG. 7 is a perspective view of another embodiment of an expandable clamp made in accordance with the present invention. As can be seen in FIG. 7, this embodiment of an expandable clamp is thinner than the embodiment shown in FIG. 3.

As also shown in FIG. 7, the expandable clamp includes a stretchable material 71 positioned around a groove in its perimeter. This urges the opposing jaws of the expandable clamp together when they have not been forced apart by the set screw. This facilitates quick insertion of the expandable clamp into a frame member and, similarly, quick insertion of its jaws into the opposing frame member. In the preferred embodiment, the stretchable material 71 is a rubber band.

Of course, compressible material, such as the compressible material 3 shown in FIG. 1, could be inserted in a space 75 to achieve the same purpose. Applicant has found, however, that this step requires a degree of precision in positioning which is inconsistent with rapid assembly.

FIG. 8 is a sectional view of the clamp of FIG. 7, taken along the line VIII—VIII, shown mated with another embodiment of a frame member made in accordance with the present invention.

FIGS. 9–12 are sectional views of other embodiments of the present invention and serve to illustrate some of the many and varied ways in which the invention can advantageously be embodied and used.

More specifically, a sectional view of a frame member having opposing and substantially separated channels is shown in FIG. 9. FIG. 10 illustrates a similar structure wherein the channels are positioned at right angles.

FIGS. 11 (*a*)–(*l*) are sectional views of still further varieties of frame members showing many different ways the channels can be positioned and, in all Figures except for (*f*), the use of plural channel sets on different sides of the frame member.

Finally, FIGS. 12 (*a*)–(*l*) are sectional views showing various frame members, being connected to panels and other articles in numerous different embodiments, all in accordance with the present invention. More specifically, FIGS. 12 (*a*)–(*e*) illustrate a frame member made in accordance with the present invention being affixed to a variety of panels of different thicknesses. FIGS. 12 (*b*) and (*e*) illustrate panels made of glass.

FIGS. 12 (*f*) and (*g*) illustrate a frame member made in accordance with the present invention having panel members affixed directly in its channels. This gives an appearance which is highly appealing in several applications. FIG. 12 (*h*), moreover, illustrates a solid panel being sandwiched to a piece of glass which is useful in several applications, including framing applications.

FIG. 12 (*g*) illustrates two glass members being inserted in the dual channels of a frame member made in accordance with the present invention. This is useful in situations where acoustic isolation is necessary. With respect to FIG. 12 (*g*), the glass members can be made to slide within the channel.

FIG. 12 (*i*) illustrates a frame member made in accordance with the present invention in which a piece of glass has been inserted in one channel and in which a track has been affixed to the other channel. FIG. 12 (*j*) illustrates the configuration of FIG. 12 (*i*) arranged in a rectangular fashion which can meet a variety of applications, including a show case.

FIG. 12 (*k*) shows a plan embodiment using the configurations of FIGS. 12 (*f*) and (*h*).

FIG. 12 (*l*) illustrates a frame member made in accordance with the present invention in which a sliding channel has been inserted and also shows the panel member having affixed thereto a slidable pulley which rides in the slidable channel.

FIG. 13 is a perspective view of an alternative embodiment of a clamp 81 which can be used to join the two frame members shown in FIG. 2. The details of this embodiment are best understood by reference to FIG. 14, which is a sectional view of FIG. 13, taken along the line XIV—XIV.

Figure 14:
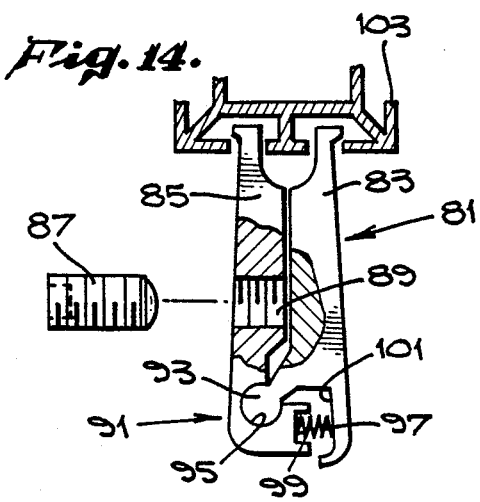
FIG. 14 is a sectional view of FIG. 13 taken along the line XIV—XIV.

As can be seen in FIG. 14, the expandable clamp 81 includes jaws 83 and 85, a set screw 87 which is threadably engaged with an opening 89 in the jaw 85. It further includes a cylindrical joint 91, which includes a inner cylinder 93 which is affixed to the jaw 83 and an outer cylinder 95 which is affixed to the jaw 85.

Expandable clamp 81 further includes a spring 97 which is compressingly interposed between rearward opposing faces 99 and 101 of the jaws 85 and 83, respectively. Although not explicitly shown in FIG. 14, opposing faces 99 and 101 can have embedded within them recesses which accommodate and stabilize the spring at 97.

The purposes of the spring 97 is the same as the purpose of the stretchable material 71 shown in FIG. 7 and the compressible material 3 shown in FIG. 1, namely to facilitate quick insertion of the expandable clamp 81 into a frame member 103 by ensuring that its jaws 83 and 85 are closed when the set screw 87 does not protrude beyond the threaded opening 89. The spring 97, however, is far more durable than the compressible material 3 for the stretchable material 71, and also is easier to install than the compressible material 3.

Although only one spring is illustrated in FIGS. 13 and 14, it is to be understood that more than one spring could advantageously be inserted between opposing faces 99 and 101, all within the scope of the present invention.

Although the set screw 67 has been shown in FIG. 5 as a preferred means for causing expansion of the expandable clamp 17, it is to be understood that various other means could be used to cause the expandable clamp 17 to expand, all in accordance with the present invention. Similarly, although the hollow space 73 has been shown in the preferred embodiment to be in the shape of a half cylinder, other shapes could be used, again all within the scope of the present invention.

Figure 15:
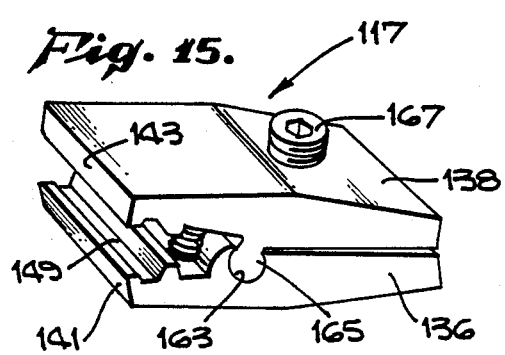
FIG. 15 is a perspective view of a still further alternative exemplary embodiment of clamp member within the scope of the present invention.
Figure 16:
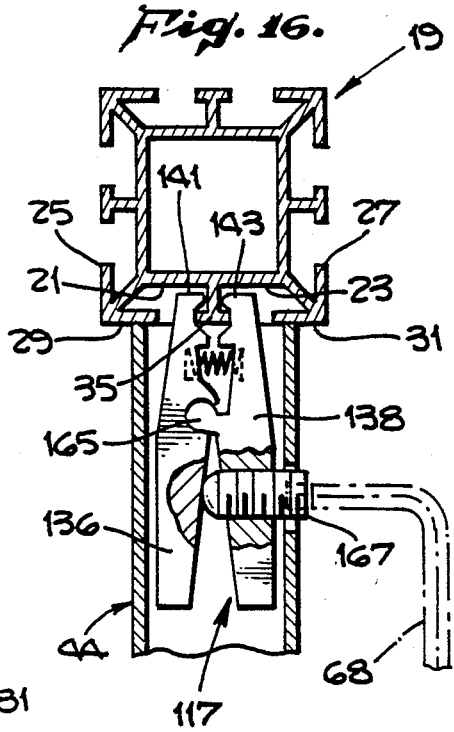
FIG. 16 is a section view of the clamp shown in FIG. 15 showing the opposing jaws clamped upon a T-shaped rail positioned between opposing channel members of a frame member.
Figure 17:
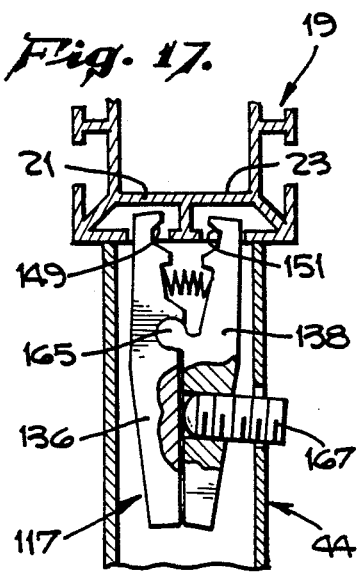
FIG. 17 is a view as in FIG. 16 showing the clamp in a released position.

Referring now to FIGS. 15 through 17, a still further alternative exemplary embodiment of expandable clamp, within the present invention, is illustrated generally at 117. As in the prior embodiment, the clamp, indicated generally at 117, is intended to fit within the cavity of a hollow frame member between opposing planar side walls and attach such frame member to an adjacent frame member as frame member 19 illustrated in FIGS. 16 and 17. Frame member 19 as discussed previously herein, is provided with a pair of channels 21 and 23 formed by the side rails 25 and 27 together with the T-shaped center rail 35. Side rails 25 and 27 have and flanges 29 and 31. The T-shaped center rail 35 has opposing flanges formed by the head of the inverted T of its T-shaped configuration as seen in FIGS. 16 and 17.

The expandable clamp 117 of the present embodiment is provided with jaws 136 and 138 which include jaw heads 141 and 143. In this embodiment, jaw heads 141 and 143 present opposing, inwardly directing wedge surfaces 149 and 151, as best seen in FIGS. 15 and 17, which are provided to clamp upon the T-shaped center rail 35 as seen in FIG. 16.

In order to close jaws 141 and 143 about the center rail 35 in the present embodiment, and similarly to the prior embodiments, the jaw 136 is provided with a cylindrical journal surface 163 while the jaw 143 is provided with a cylinder 165 which rest in and is journalled upon the cylindrical surface 163. Manipulation of set screw 167, as in the prior embodiments by an alan wrench 68 facilitates the expansion of the jaw bodies from the position of FIG. 17 to that of FIG. 16 to clamp the adjacent frame members to one another substantially as discussed hereinbefore, with the exception that the jaws clamp upon the center T-shaped rail 35 rather than upon the opposing end flanges 29 and 31.

Having thus disclosed exemplary embodiments of the modular panel frame assembly system, in accordance with the present invention, it should be understood by those skilled in the art that the within disclosure is exemplary only and is not an exhaustive listing of all of the materials and parameters and that various other alternatives, adaptions, embodiments and modifications may be made within the scope of the present invention. Accordingly, the present invention is not limited to the specific embodiments described and/or illustrated herein, but only by the following claims.

What is claimed is:

1. A panel frame assembly system of frame members and member connecting expandable clamps comprising:
   a first at least partially hollow frame member having an open end with opposing planar interior surfaces;
   a second frame member having a pair of adjacent channels having openings extending along at least one side thereof, said second member having a pair of spaced side rails, each having an in turned end flange extending laterally toward the other to define outer edges of the openings of the adjacent channels and a center rail of generally T-shaped configuration to provide a center rail end flange with two free edges defining inner edges of the openings of the adjacent channels, said in turned end flange of each of said side rails and said center rail end flange lying in substantially the same plane; and,
   an expandable clamp sized to fit within said first frame member via said open end between said planar interior surfaces and having means for expanding at least portions of said clamp to engage said first frame member so as to prevent removal of the clamp therefrom, said expandable clamp comprising a pair of jaws in relatively moveable relation, each comprising a jaw body having a jaw heat mounted in vertically spaced relation to a jaw neck, said jaw heads being spaced apart from each other a distance greater than the width of said center rail end flange and less than the spacing between said side rail end flanges so as to fit into said channels and said means for expanding being provided as to wedge said jaw heads against said second frame member in said channels inwardly thereof relative said plane.

2. The panel frame assembly system of claim 1 wherein:
   each of said jaws has an exterior surface of generally planar configuration,
   each of said jaw heads has an outwardly directed face relative to each other, and
   the jaw head face of each jaw is in substantial alignment with the exterior surface of such jaw.

3. The panel frame assembly system of claim 2 wherein:
   said jaw heads are provided with wedge surfaces, and
   the spacing and sizing of the in turned end flanges of said spaced side rails is predetermined to receive the clamp jaw heads therebetween when said clamp is not in an expanded configuration and to cooperate with wedge surfaces on said jaw heads to wedge said second frame member against said first frame member when said clamp is in an expanded configuration.

4. The panel frame assembly system of claim 1 wherein said frame members are made of extruded metal.

5. The panel frame assembly of claim 1 wherein said first frame member has at least two channels on one side thereof.

6. The panel frame assembly of claim 1 wherein each of said jaws has an exterior and an interior surface and wherein said exterior surface is inclined inwardly with respect to said interior surface.

7. The panel frame assembly system of claim 1 wherein:
   each of said jaws has an exterior surface of generally planar configuration, and
   each of said jaw heads has an inwardly directed face relative to each other.

8. The panel frame assembly system of claim 1 wherein:
   each of said jaws has an exterior surface of generally planar configuration
   each of said jaw heads has an inwardly directed face relative to each other, and
   the jaw head face of each jaw is engageable with said center rail end flange.

9. A panel frame expandable clamp for use with a panel frame member having a pair of spaced channels defined by outer side rails having in turned end flanges and a center rail, said side rails and center rail lying in substantially the same plane, said clamp comprising:
   a pair of jaws in relatively expandable relation and means for moving at least portions of said jaws between non-expanded and expanded configurations; and a pair of jaw heads and means for mounting said heads, one on each of said jaws, in spaced relation to receive the center rail therebetween and to fit between the side rail end flanges when said jaws are passed through said plane in said non-expanded configuration.

10. The panel frame expandable clamp of claim 9 wherein:

each jaw head is provided with an outer face which merges with an inwardly extending downwardly inclined wedged surface for engaging the side rail when said jaw is moved to said expanded configuration, and wherein said outer face is substantially in alignment with the plane of the exterior surface of its associated jaw.

11. The panel frame expandable clamp of claim 9 wherein:

each jaw head is provided with an inwardly directed face which has a downwardly inclined wedged surface for engaging the center rail when said jaw is moved in its expanded configuration.

12. The clamp of claim 11 wherein said means for moving said jaws includes a set screw and wherein said set screw is mounted a substantial distance from said jaw heads.

* * * * *